Feb. 6, 1934.  C. H. HAPGOOD  1,946,400
DEVICE FOR CLEANING TEAT CUPS
Filed Oct. 29, 1931
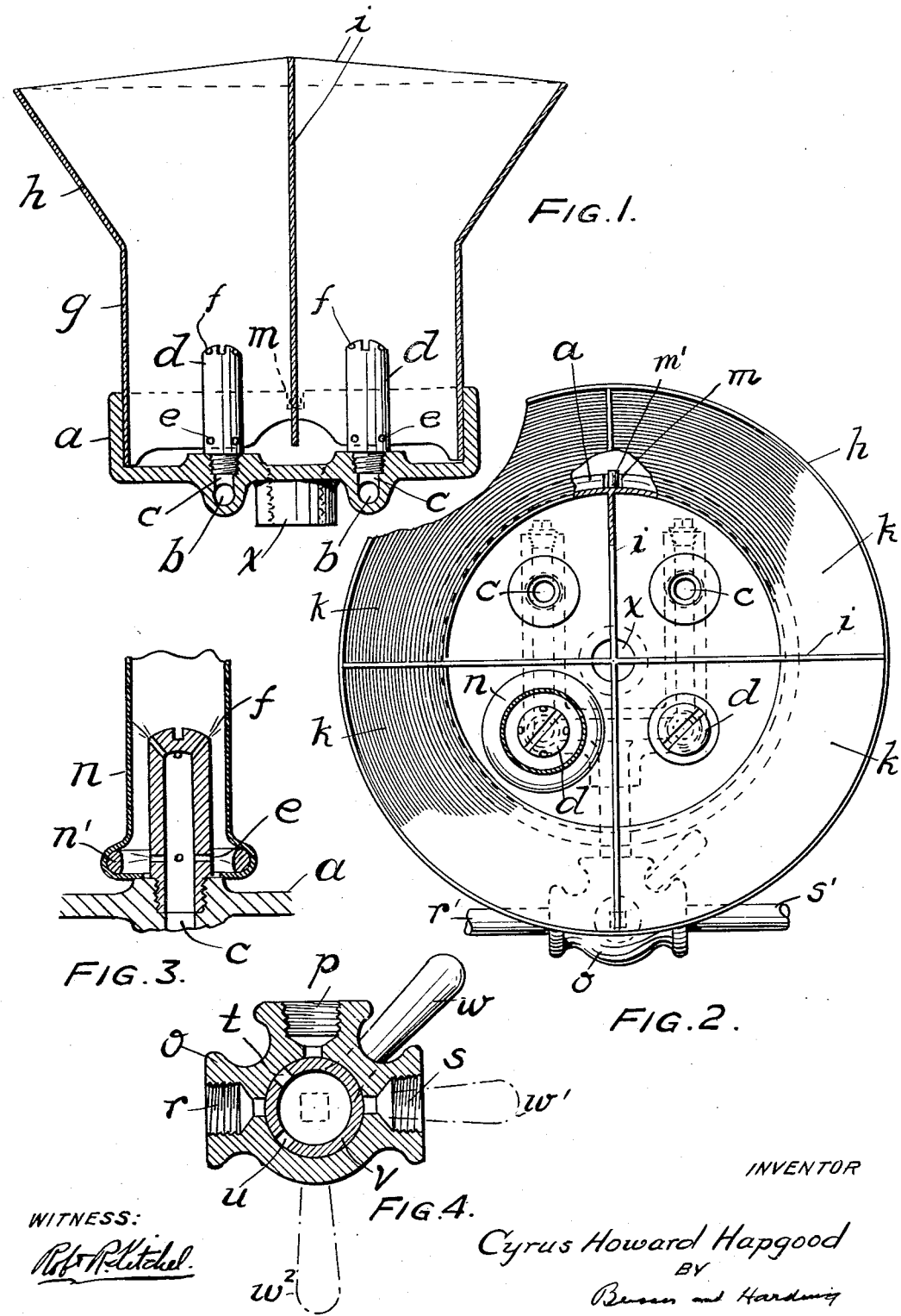

Patented Feb. 6, 1934

1,946,400

UNITED STATES PATENT OFFICE 1,946,400

DEVICE FOR CLEANING TEAT CUPS

Cyrus Howard Hapgood, Nutley, N. J., assignor to The De Laval Separator Company, New York, N. Y., a corporation of New Jersey Application October 29, 1931. Serial No. 571,753

3 Claims. (Cl. 141—1)

In order to properly clean the teat cups of milking machines it is necessary to first flush them with cold water, then with hot water and then with cold water. One object of the invention is to provide a device for flushing teat cups which comprises nozzles adapted to direct jets of cold water and hot water against such parts of the inner walls of the teat cups and in such directions as to effectively clean their entire surfaces. Another object of the invention is to provide means whereby the four teat cups of a set may be properly positioned relative to said jets. Another object of the invention is to provide for the teat cups a container or receptacle comprising four compartments which are readily removable from the receptacle base. Another object of the invention is to provide valve mechanism for readily controlling the successive flow of cold water, hot water and cold water. The construction herein described and illustrated, which represents one preferred embodiment of the invention, accomplishes the stated objects and also contains other advantageous structural features, such as the construction of the jet nozzles and the means for distributing cleaning fluid thereto.

Fig. 1 is a sectional elevation of the teat cup cleaning container.

Fig. 2 is a plan view of the same with one of the teat cups in position.

Fig. 3 is a detail vertical sectional view of one of the jet nozzles and one end of a teat cup.

Fig. 4 is a detail cross sectional view of the valve.

Formed in the base $a$ of a container are horizontal channels $b$ communicating with an outside valve chamber $o$. Extending upward from channels $b$ are holes $c$ opening in the floor of the container base and threaded to receive nozzles $d$. These nozzles are four in number and are arranged ninety degrees apart at equal radial distances from the center of the container base. The nozzles each comprise an inverted cup containing radially extending holes $e$ near the bottom and diagonally upwardly and outwardly extending holes $f$ at the top.

Insertable within the flanged base $a$ is the container wall, which comprises a lower cylindrical portion $g$ and an upper funnel shaped portion $h$. Between the walls extend vertical partitions $i$ forming four sector shaped compartments $k$. A pin $m'$ on the container wall is adapted to engage a recess $m$ in the upper edge of the flange of the container base, thereby so positioning the partitions relative to the nozzles $d$ that each nozzle will be equidistant from the partitions, or radial walls, of its compartment.

The partitions $i$ are spaced from the base of the container so as to allow outflow of water through the outlet $x$.

The four teat cups of a set are positioned in the several compartments so that the lower end of each teat cup $n$ will surround the corresponding nozzle, as shown in Fig. 3. The dimensions of the compartments are such that the teat cups, when slipped thereinto, will automatically position themselves as described.

The valve casing $o$ is provided with three openings, one, $p$, connected with the center of one of the distributing channels $b$, another, $r$, connected with a pipe $r'$ connected with a source of cold water and the third, $s$, connected with a pipe $s'$ connected with a source of hot water. Within the valve casing is a cylindrical valve $v$ having in its wall two orifices $u$ and $t$. The valve is provided with a handle $w$.

When the valve is in the position shown in Fig. 4, there is no flow of water to the distributing channels $b$ and nozzles $d$. When the valve handle is turned to the dotted line position $w'$, cold water flows, through pipe $r'$, opening $r$, orifice $u$, the interior of the valve, orifice $t$ and opening $p$, into the distributing channels $b$, thereby admitting cold water thereto, which escapes into the nozzles $d$ and discharges therefrom into the teat cups so as to effectively flush their interior surfaces, the jets through holes $e$ effectively cleaning the pockets formed by the retaining rings $n'$.

When the valve handle is turned to the dotted line position $w^2$, hot water flows, through pipe $s'$, opening $s$, orifice $t$, the interior of the valve, orifice $u$ and opening $p$ into the distributing channels $b$ and nozzles $d$, thereby flushing the interiors of the teat cups with hot water.

The valve handle is then returned to position $w$ and the teat cups are finally flushed with cold water. The valve is then returned to its closed position.

The above construction affords a convenient means for efficiently flushing the teat cups successively with cold water, warm water and cold water, which successive operations are required in order to effect satisfactory cleaning. The construction also has the advantage that when the teat cups are deposited in their respective compartments, they automatically position themselves in proper relation to the flushing nozzles. The removable retainer wall described facilitates the cleaning of the apparatus.

What I claim and desire to protect by Letters Patent is:

1. In a device for cleaning teat cups, a container comprising a base provided with distributing channels, an enclosing wall and radial partitions dividing the container into compartments, jet nozzles mounted on the base and in communication with said channels and positioned within the respective compartments, the container wall with its partitions being removable, and means to so position the container wall and its partitions relative to the nozzles that each nozzle will occupy a median position between the radial walls of its compartment.

2. In a device for cleaning teat cups, a container comprising a base provided with distributing channels, jet nozzles mounted on the base and in communication with said channels, an enclosing wall carried on the base, and radial partitions within the enclosing wall and forming therewith sector-shaped compartments each of which has a horizontal section just large enough to freely accommodate a teat cup, the nearest distances from the nozzle to each partition and to the enclosing wall being substantially equal so that, when a set of teat cups is inserted in the compartments, all the teat cups will automatically position themselves concentrically with the jet nozzles.

3. A device for cleaning teat cups in accordance with claim 2 in which the container wall is funnel shaped at its top.

CYRUS HOWARD HAPGOOD.